United States Patent
Hozumi

(10) Patent No.: US 7,398,982 B2
(45) Date of Patent: Jul. 15, 2008

(54) SUSPENSION DEVICE

(75) Inventor: Yutaka Hozumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 11/072,627

(22) Filed: Mar. 7, 2005

(65) Prior Publication Data

US 2005/0200094 A1    Sep. 15, 2005

(30) Foreign Application Priority Data

Mar. 12, 2004  (JP)  ............................ 2004-070580
Mar. 12, 2004  (JP)  ............................ 2004-070581

(51) Int. Cl.
*B62D 7/018* (2006.01)

(52) U.S. Cl. ........................... 280/93.512; 280/93.511; 280/124.135; 280/86.758

(58) Field of Classification Search ............ 280/93.512, 280/93.511, 124.135, 86.758
See application file for complete search history.

(56) References Cited

U.S. PATENT DOCUMENTS

| 5,366,233 | A |   | 11/1994 | Kozyra et al. |   |
|---|---|---|---|---|---|
| 5,498,018 | A |   | 3/1996 | Wahl et al. |   |
| 5,577,758 | A | * | 11/1996 | Csik | 280/124.134 |
| 5,895,063 | A | * | 4/1999 | Hasshi et al. | 280/124.134 |
| 6,027,130 | A | * | 2/2000 | Kawabe et al. | 280/124.135 |
| 6,047,789 | A | * | 4/2000 | Iwanaga | 180/440 |
| 6,116,626 | A | * | 9/2000 | Cherry et al. | 280/124.135 |
| 6,116,627 | A | * | 9/2000 | Kawabe et al. | 280/124.15 |
| 6,604,887 | B2 | * | 8/2003 | Carreira | 403/373 |
| 6,612,593 | B2 | * | 9/2003 | Mikasa et al. | 280/86.758 |
| 6,782,731 | B2 | * | 8/2004 | Lee | 73/11.07 |
| 6,843,492 | B2 | * | 1/2005 | Inoue et al. | 280/124.135 |
| 6,945,541 | B2 | * | 9/2005 | Brown | 280/5.507 |
| 6,974,138 | B2 | * | 12/2005 | Perello et al. | 280/5.522 |
| 6,997,467 | B2 | * | 2/2006 | Dean | 280/93.512 |
| 7,117,599 | B2 | * | 10/2006 | Sadanowicz et al. | 29/894.361 |
| 7,140,625 | B2 | * | 11/2006 | Dean | 280/124.146 |

(Continued)

FOREIGN PATENT DOCUMENTS

DE    43 40 557 C2    11/1993

(Continued)

*Primary Examiner*—Ruth Ilan
*Assistant Examiner*—Timothy Wilhelm
(74) *Attorney, Agent, or Firm*—Arent Fox LLP

(57) ABSTRACT

A knuckle is formed by a knuckle body and a lower arm support bracket fastened to front and rear fastening portions provided in a lower portion of the knuckle body with front and rear bolts. When the knuckle bumps from a normal position, an angle of a line connecting fastening surfaces of the front and rear fastening portions moves closer to the horizontal. Thus, if a vehicle body leans outward in a turning direction by centrifugal force caused by turning of a vehicle and a turning outside wheel thus bumps, and a turning lateral force acting inward in the turning direction is applied to a ground contact point of the turning outside wheel, a difference between distances from a road surface to the fastening surfaces of the front and rear fastening portions is reduced when a compression load of a lower arm against the turning lateral force is applied to the lower arm support bracket, thereby reducing a difference between loads applied to the front and rear bolts placed in the fastening surfaces to provide uniform durability.

11 Claims, 8 Drawing Sheets

U.S. PATENT DOCUMENTS

| | | |
|---|---|---|
| 7,159,316 B2 * | 1/2007 | Sadanowicz et al. ... 29/894.361 |
| 2002/0043780 A1 * | 4/2002 | Sandahl et al. ........ 280/124.135 |
| 2002/0050694 A1 * | 5/2002 | Mikasa et al. .......... 280/86.758 |
| 2003/0038441 A1 * | 2/2003 | Fornbacher et al. .... 280/93.512 |
| 2003/0067135 A1 * | 4/2003 | Wagner et al. ........ 280/124.135 |
| 2004/0046350 A1 * | 3/2004 | Wagner et al. ........ 280/124.135 |
| 2004/0100062 A1 * | 5/2004 | Inoue et al. ........... 280/124.135 |
| 2004/0140641 A1 * | 7/2004 | Eppelein .............. 280/124.135 |
| 2004/0256826 A1 * | 12/2004 | Niebling et al. ........ 280/93.512 |
| 2005/0067805 A1 * | 3/2005 | Kim ...................... 280/93.512 |
| 2005/0098964 A1 * | 5/2005 | Brown ........................ 280/5.5 |
| 2005/0200092 A1 * | 9/2005 | Orimoto et al. ........ 280/93.512 |

FOREIGN PATENT DOCUMENTS

| | | |
|---|---|---|
| GB | 729039 | 5/1955 |
| GB | 817244 | 7/1959 |
| JP | 63297151 A * | 12/1988 |
| JP | 1-190510 | 7/1989 |
| JP | 01-197105 | 8/1989 |
| JP | 1-197106 | 8/1989 |
| JP | 1-223011 | 9/1989 |
| JP | 04-237611 | 8/1992 |

* cited by examiner

SUSPENSION DEVICE

RELATED APPLICATION DATA

The Japanese priority application Nos. 2004-70580 and 2004-70581 upon which the present application is based are hereby incorporated in their entirety herein by reference.

BACKGROUND OF THE INVENTION

1. Field of the Invention

The present invention relates to a suspension device including: a knuckle formed by a knuckle body and a lower arm support bracket fastened to front and rear fastening portions provided in a lower portion of the knuckle body with front and rear bolts; and a lower arm having an inner end portion in a vehicle width direction connected to a vehicle body, and an outer end portion in the vehicle width direction connected to the lower arm support bracket.

2. Description of the Related Art

FIGS. 7 and 8 show a conventional suspension device. A knuckle 01 of the suspension device is formed by connecting a lower arm support bracket 03 to a lower end of a knuckle body 02 with two bolts 04 and 05. An outer end of an upper arm 06 in a vehicle width direction is connected to an upper end of the knuckle 01 via a ball joint 08. An outer end of a lower arm 07 in the vehicle width direction is connected to the lower arm support bracket 03 via a ball joint 09. A pair of fastening portions 02a and 02b protruding downward are integrally formed at front and rear ends in a lower portion of the knuckle body 02. Front and rear ends of the lower arm support bracket 03 are fastened to fastening surfaces of the fastening portions 02a and 02b with the bolts 04 and 05.

When a vehicle turns at high speed, a vehicle body leans outward in a turning direction by centrifugal force caused by the turning and a turning outside wheel thus bumps, and a turning lateral force acting inward in the turning direction is applied to a ground contact point of the turning outside wheel. As shown in FIG. 8, in the knuckle 01 of the conventional suspension device, a line L connecting the fastening surfaces of the front and rear fastening portions 02a and 02b at which the lower arm support bracket 03 is fastened to the knuckle body 02, is inclined downward to the front in a normal state (under acceleration of 1 G in a vertical direction). When a wheel bumps, the line L is further inclined downward to the front and moves to a position L'. This increases a difference in height from a road surface to the front and rear bolts 04 and 05, and when the lateral force is applied, a load applied to the rear bolt 05 becomes larger than a load applied to the front bolt 04 for reasons described in embodiments. Thus, when front and rear bolts 04 and 05 having the same diameter are used, durability of the rear bolt 05 to which a larger load is applied may be reduced.

In the above described conventional suspension device, when no load F toward a rear of a vehicle body is applied to a wheel W, a line A connecting the two bolts 04 and 05 fastening the lower arm support bracket 03 to the lower end of the knuckle body 02 is aligned with a front-rear direction of the vehicle body. Thus, when the wheel W passes over an uneven spot on the road surface or a brake is applied to the wheel W to cause the load F toward the rear of the vehicle body to act on the knuckle 01, the line A tends to toe-out to a position A' together with the wheel W.

As a result, the front bolt 04 is displaced outward in the vehicle width direction from the line A running along the front-rear direction of the vehicle body, and the rear bolt 05 is displaced inward in the vehicle width direction from the line A along the front-rear direction of the vehicle body, and thus the load F causes a significant moment with the displacement as moment arms to act on the fastening portions 02a and 02b of the knuckle body 02. This problem requires some countermeasures such as increasing thicknesses of the front and rear bolts 04 and 05, thereby increasing weights.

SUMMARY OF THE INVENTION

The present invention has been achieved in view of the above-mentioned circumstances, and has an object to make uniform or reduce loads acting on front and rear bolts fastening a lower arm support bracket to a lower portion of a knuckle body.

In order to achieve the object, according to a first feature of the present invention, there is proposed a suspension device including: a knuckle formed by a knuckle body and a lower arm support bracket fastened to front and rear fastening portions provided in a lower portion of the knuckle body with front and rear bolts; and a lower arm having an inner end portion in a vehicle width direction connected to a vehicle body, and an outer end portion in the vehicle width direction connected to the lower arm support bracket; an angle of a line connecting fastening surfaces of the front and rear fastening portions changing according to a bump and a rebound of the knuckle, wherein the angle of the line moves closer to the horizontal as the knuckle bumps from a normal position.

With the above described configuration, when the knuckle formed by the knuckle body and the lower arm support bracket fastened to the front and rear fastening portions provided in the lower portion of the knuckle body with the front and rear bolts bumps from the normal position, the angle of the line connecting the fastening surfaces of the front and rear fastening portions moves closer to the horizontal. Thus, if a vehicle body leans outward in a turning direction by centrifugal force caused by turning of a vehicle and a turning outside wheel thus bumps, and a turning lateral force acting inward in the turning direction is applied to a ground contact point the turning outside wheel, a difference between distances from a road surface to the fastening surfaces of the front and rear fastening portions is reduced when a compression load of the lower arm against the turning lateral force is applied to the lower arm support bracket, thereby reducing a difference between loads applied to the front and rear bolts placed in the fastening surfaces to provide uniform durability.

According to a second feature of the present invention, there is proposed a suspension device including: a knuckle formed by a knuckle body and a lower arm support bracket fastened to front and rear fastening portions provided in a lower portion of the knuckle body with front and rear bolts; and a lower arm having an inner end portion in a vehicle width direction connected to a vehicle body, and an outer end portion in the vehicle width direction connected to the lower arm support bracket, wherein a line connecting the front and rear bolts normally toes-in, and a toe-in angle decreases when a load toward a rear of the vehicle body is applied to the knuckle.

With the above described configuration, the line connecting the front and rear bolts fastening the lower arm support bracket to the lower portion of the knuckle body normally toes-in when no load toward the rear of the vehicle body is applied to the knuckle, but when a wheel passes over an uneven spot on a road surface or a brake is applied to the wheel to cause the load toward the rear of the vehicle body to act on the knuckle, the load causes the wheel to toe-out to reduce the toe-in angle of the line. This causes the front and rear bolts to be aligned with a front-rear direction of the vehicle body to reduce displacement in the vehicle width direction, and reduce moment of the load toward the rear of the vehicle body to twist the knuckle, thereby reducing the loads acting on the bolts to enhance durability.

The above-mentioned object, other objects, characteristics, and advantages of the present invention will become apparent from an explanation of preferred embodiments, which will be described in detail below by reference to the attached drawings.

DESCRIPTION OF THE PREFERRED EMBODIMENT

Now, a first embodiment of the invention will be described with reference to FIGS. 1 to 5.

Figure 1:
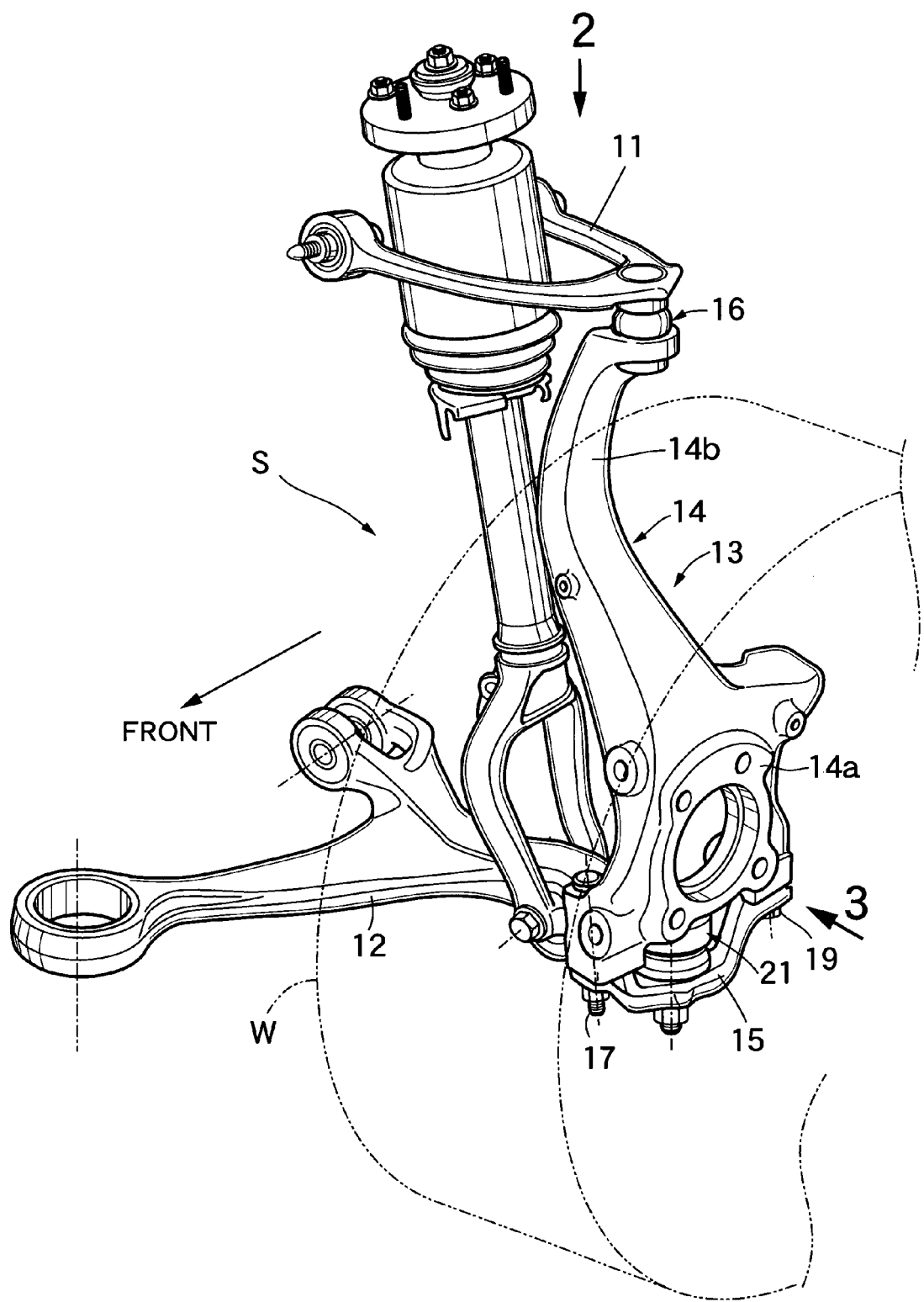
FIG. 1 is a perspective view of a double wishbone type suspension of a left rear wheel, according to a first embodiment of the invention.
Figure 2:
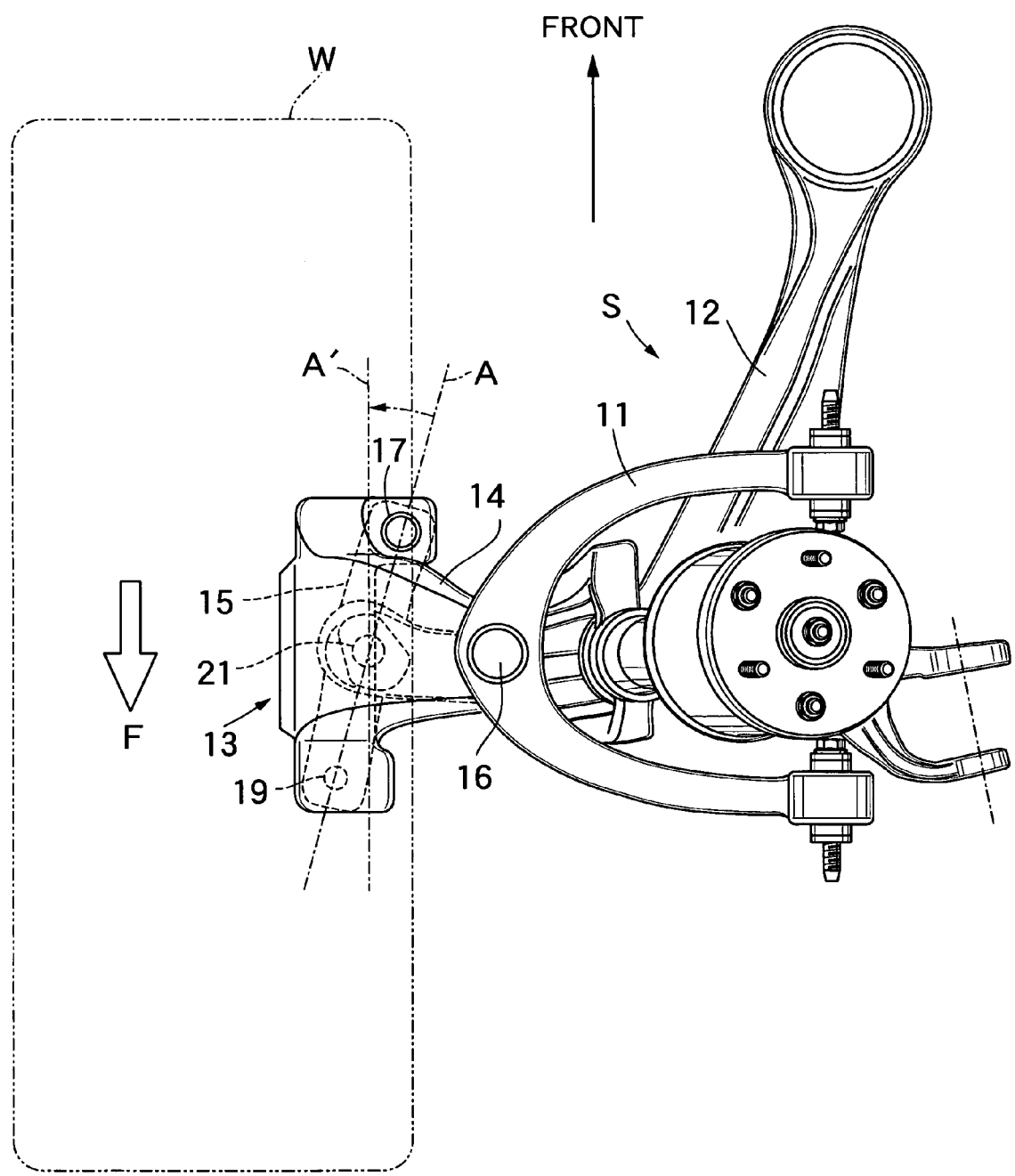
FIG. 2 is a view from a direction of an arrow 2 in FIG. 1.
Figure 3:
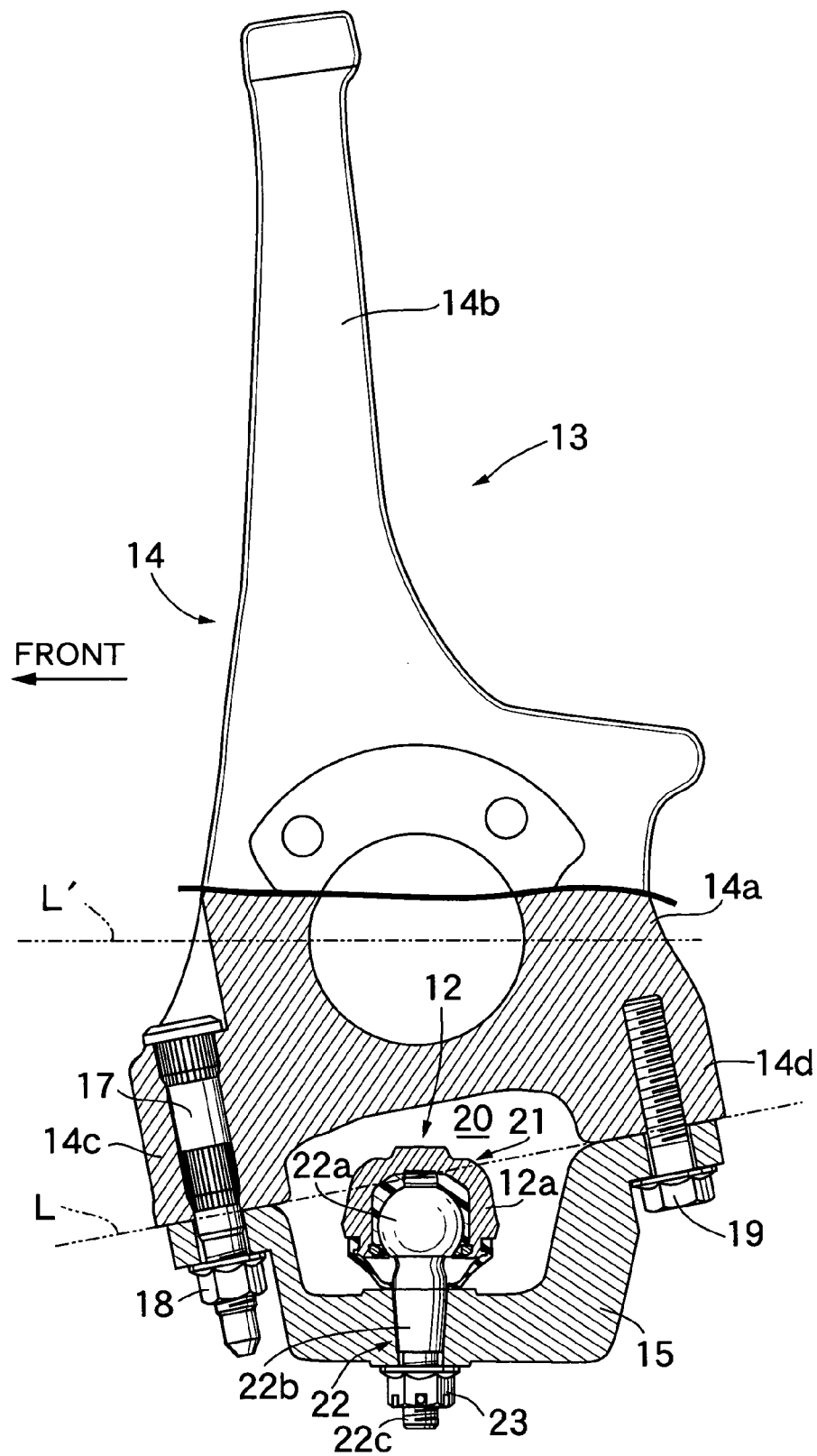
FIG. 3 is an enlarged view from a direction of an arrow 3 in FIG. 1.

As shown in FIGS. 1 to 3, a double wishbone type suspension device S includes a knuckle 13 supported on a vehicle body by an upper arm 11 and a lower arm 12. The knuckle 13 includes a knuckle body 14 forged from light alloy and a lower arm support bracket 15 made of ferrous material and fastened to a lower portion of the knuckle body 14. The knuckle body 14 includes an axle support portion 14a rotatably supporting an axle of a wheel W and an upper arm support portion 14b extending upward from the axle support portion 14a. An outer end of the upper arm 11 in a vehicle width direction is pivotably supported on an upper end of the upper arm support portion 14b via a ball joint 16.

Figure 4:
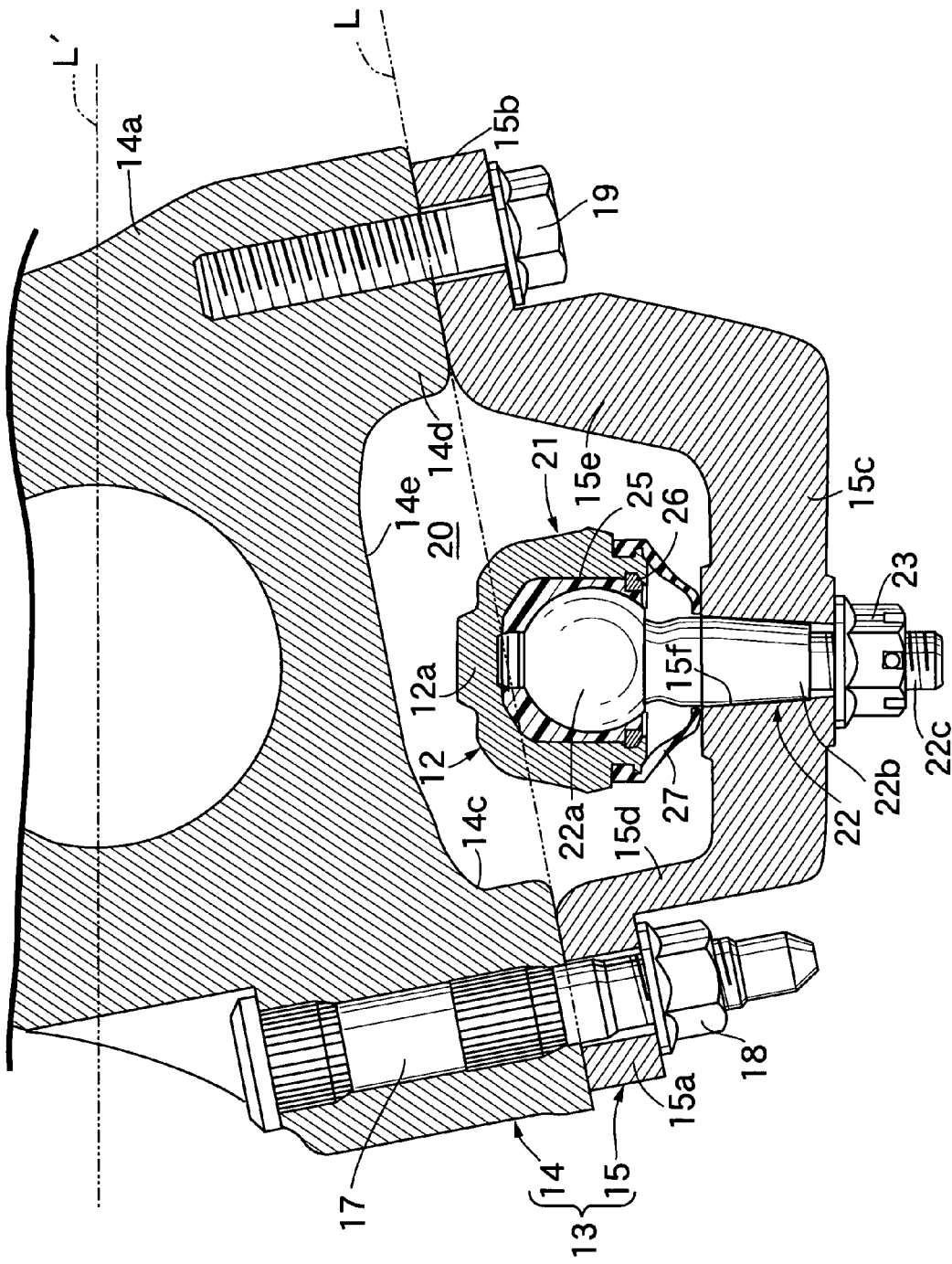
FIG. 4 is an enlarged sectional view of essential portions of FIG. 3.

As is apparent from FIG. 4, a pair of fastening portions 14c and 14d protrude downward from front and rear ends in a lower portion of the axle support portion 14a of the knuckle body 14. A recess 14e bowed upward is formed between the fastening portions 14c and 14d. The lower arm support bracket 15 includes mounting portions 15a and 15b at front and rear ends, a lower arm support portion 15c in the middle, and a pair of inclined connecting portions 15d and 15e connecting the mounting portions 15a and 15b and the lower arm support portion 15c. The front mounting portion 15a is secured to a fastening surface of the front fastening portion 14c with a bolt 17 and a nut 18. The rear mounting portion 15b is secured to a fastening surface of the rear fastening portion 14d with a bolt 19. The lower arm support portion 15c of the lower arm support bracket 15 is placed in a position lower than the mounting portions 15a and 15b. An outer end of the lower arm 12 in the vehicle width direction is placed in a space 20 formed between the recess 14e of the knuckle body 14 and the lower arm support portion 15c of the lower arm support bracket 15.

A ball joint 21 that pivotably supports the outer end of the lower arm 12 in the vehicle width direction on the lower arm support bracket 15 has a ball stud 22 including a spherical head 22a, a conical shaft 22b connecting to the head 22a, and an external thread 22c connecting to the shaft 22b. The shaft 22b of the ball stud 22 passes from above to down through a mounting hole 15f provided in the lower arm support portion 15c of the lower arm support bracket 15, and is secured by screwing a nut 23 onto the external thread 22c protruding downward from the lower arm support portion 15c. The ball joint 21 includes a cup-shaped housing 12a provided at an end of the lower arm 12. A synthetic resin bearing 25 in slide contact with the head 22a of the ball stud 22 is housed in the housing 12a along an inner peripheral surface thereof, and held by a retainer 26 secured so as to cover an opening of the housing 12a. A boot 27 is fitted between the opening of the housing 12a and the lower arm support portion 15c of the lower arm support bracket 15 so as to prevent dust from entering a slide surface between the head 22a of the ball stud 22 and the bearing 25.

As shown in FIG. 4, in a normal situation, that is, under acceleration of 1 G in a vertical direction, a line L connecting the fastening surfaces of the front and rear fastening portions 14c and 14d of the knuckle body 14 is inclined downward to the front. Suspension geometry is set so that when the wheel W bumps upward, the line L moves up to be horizontal (see line L').

Figure 5:
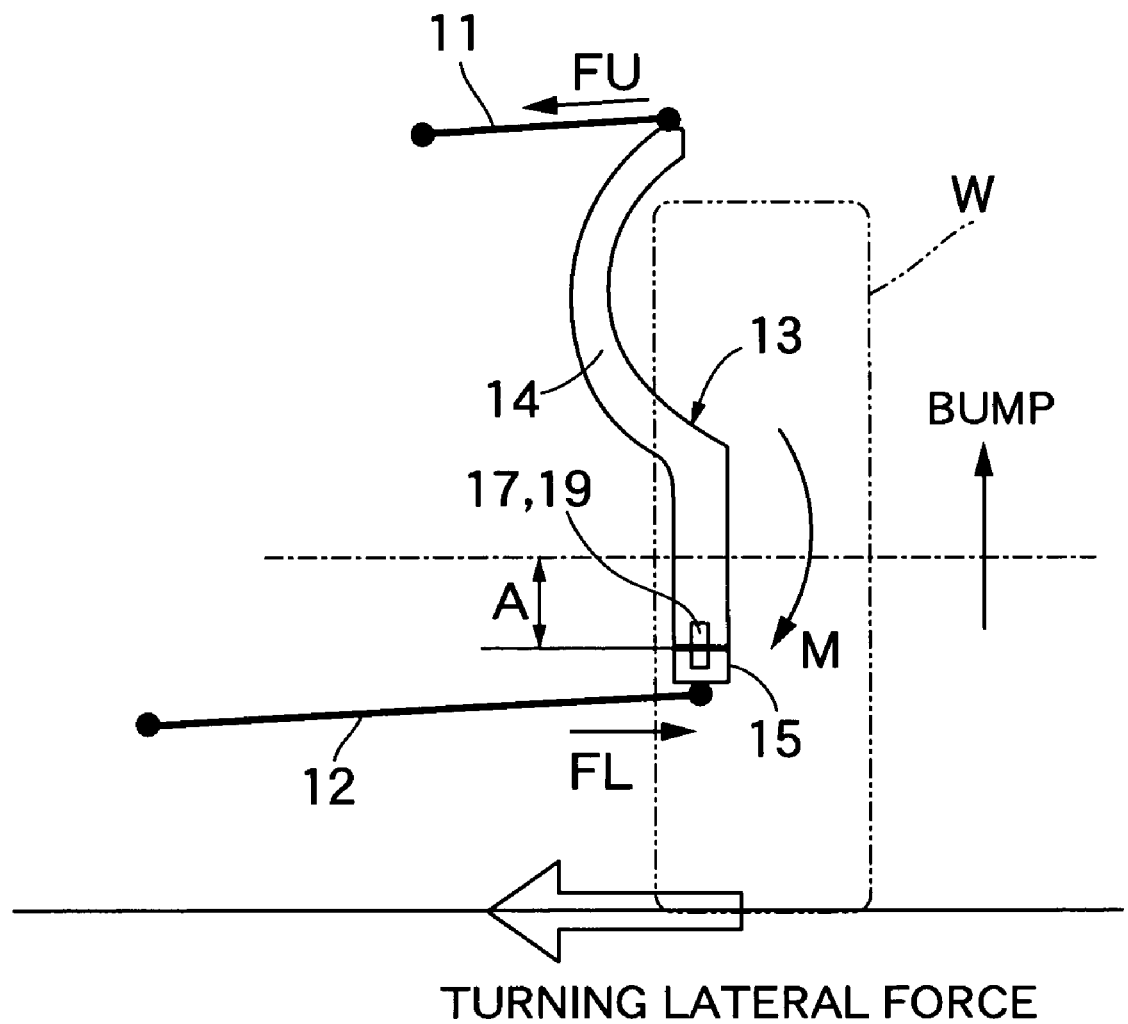
FIG. 5 illustrates action when a turning lateral force is applied to a bumping wheel.

When the vehicle turns, a vehicle body leans outward in a turning direction by centrifugal force and a load pressing a turning outside wheel against a road surface is applied, and the turning outside wheel thus bumps relative to the vehicle body. As shown in FIG. 5, a turning lateral force acting inward in the vehicle width direction is applied from the road surface to a ground contact point of the wheel W in the turning outside wheel, to apply a moment M to the knuckle 13. The moment M is cancelled by a reaction force FL to compression stress applied to the lower arm 12 and a reaction force FU to tensile stress applied to the upper arm 11. At this time, the loads acting on the front and rear bolts 17 and 19 connecting the knuckle body 14 and the lower arm support bracket 15 become larger, as a distance A from the fastening surfaces of the front and rear fastening portions 14c and 14d of the knuckle body 14 to the center of oscillation of the knuckle 13 (substantially the center of the wheel W) by the moment M becomes smaller, that is, a distance from the road surface to the fastening surfaces of the front and rear fastening portions 14c and 14d becomes larger.

Figure 7:
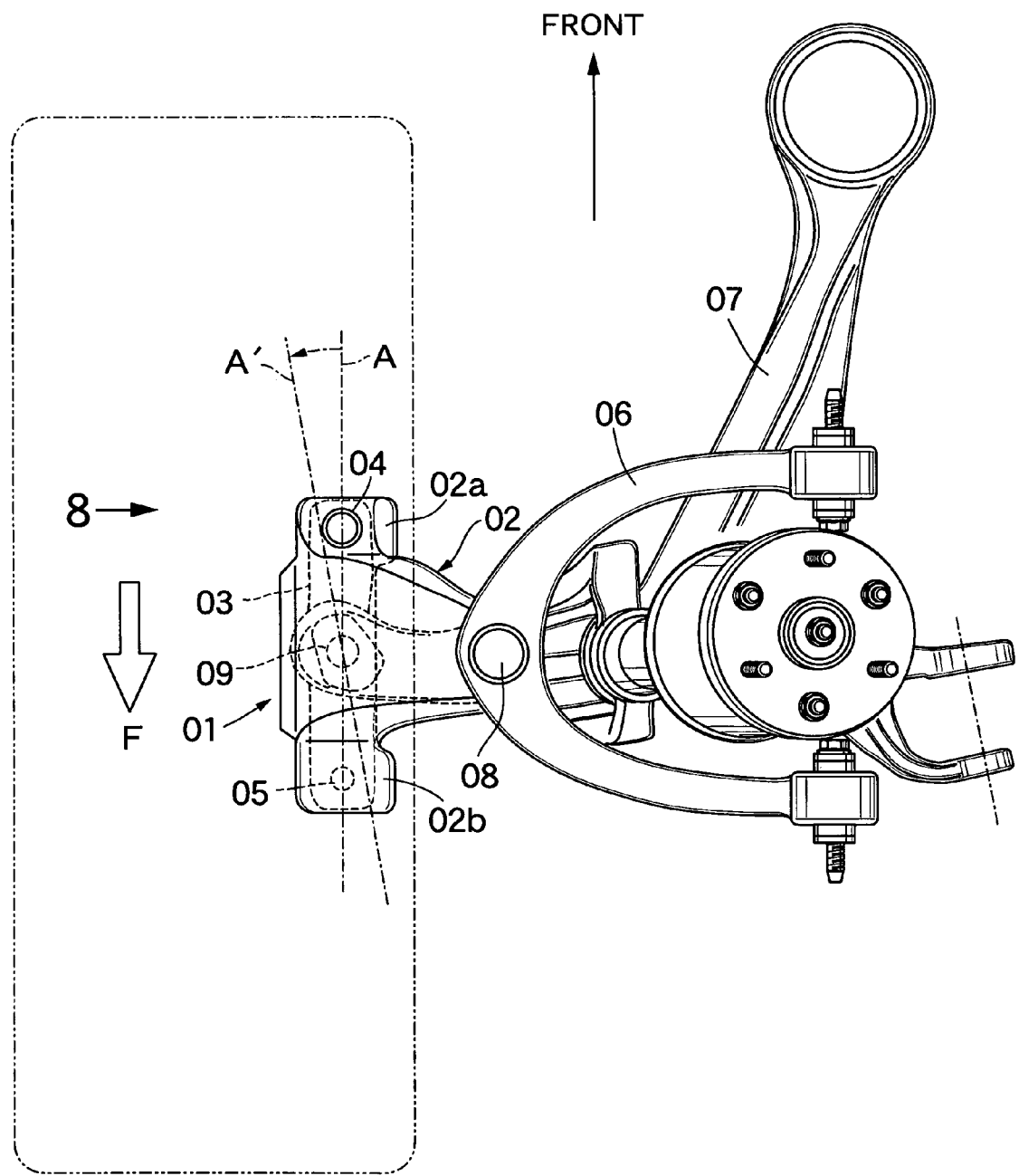
FIG. 7 is a view corresponding to FIG. 2 and showing a conventional example.
Figure 8:
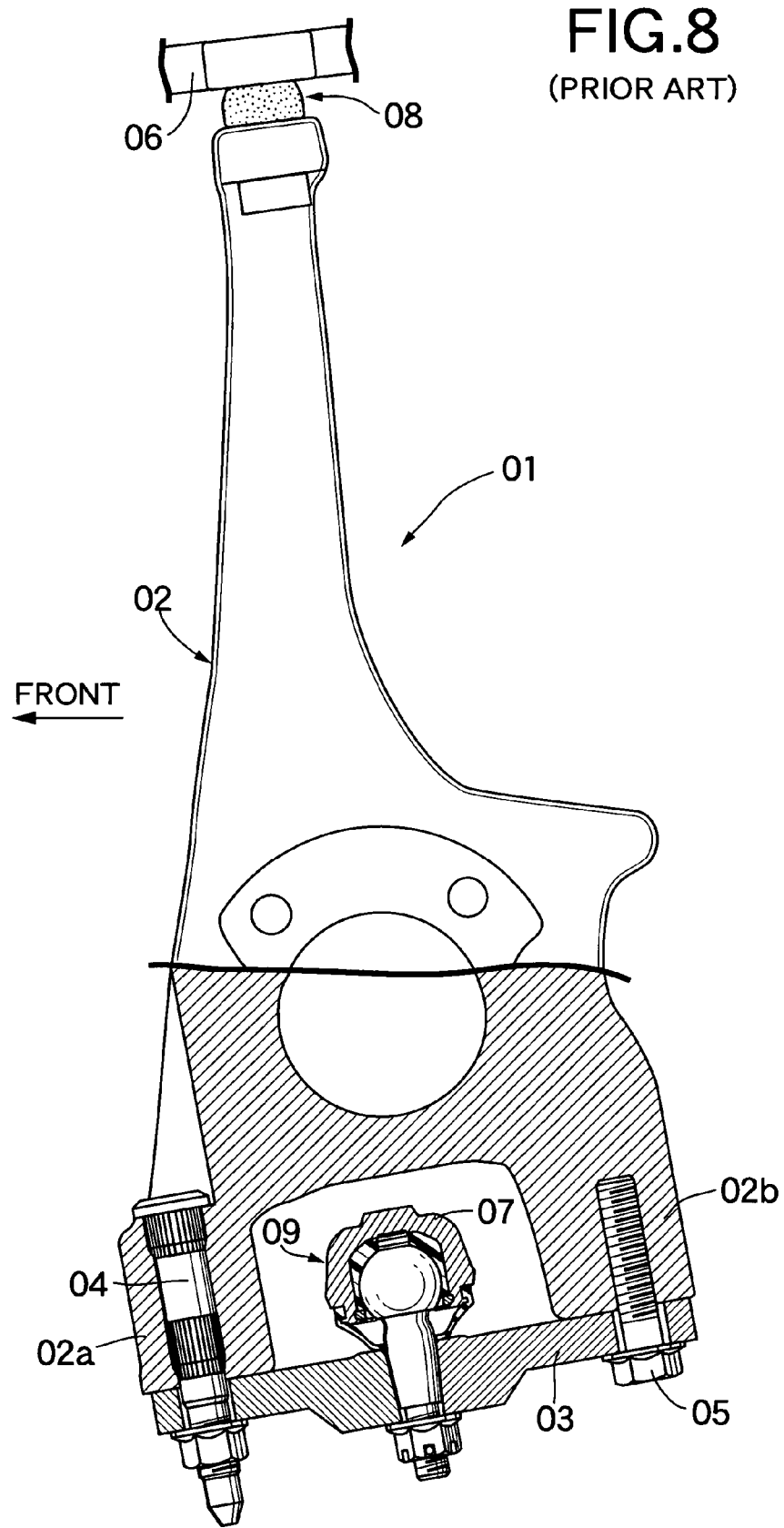
FIG. 8 is a view from a direction of an arrow 8 in FIG. 7.

Thus, a large difference in height between the fastening surfaces of the front and rear fastening portions 14c and 14d as in the conventional example in FIGS. 7 and 8 causes a large difference between the loads applied to the front and rear bolts 17 and 19 to provide nonuniform durability, which requires some countermeasures such as increasing thicknesses of the bolts 17 and 19.

In the embodiment, however, when the outside wheel W in the turning direction bumps relative to the vehicle body during the turning of the vehicle, the line L connecting the fastening surfaces of the front and rear fastening portions 14c and 14d of the knuckle body 14 moves closer to the horizontal from the state of being inclined downward to the front, which reduces the difference in height from the road surface to the fastening surfaces of the front and rear fastening portions 14c and 14d. Thus, when the moment M is applied to the knuckle 13 by the turning lateral force acting inward in the vehicle width direction applied from the road surface to the ground contact point of the outside wheel W in the turning direction, the loads applied to the front and rear bolts 17 and 19 connecting the knuckle body 14 and the lower arm support bracket 15 become uniform. This eliminates the need for the countermeasures such as increasing the thicknesses of the bolts to which large loads are applied because the bolts are placed near the center of oscillation of the knuckle 13, and prevents a larger load from being applied to one of the front and rear bolts 17 and 19 to increase durability.

As is apparent from FIG. 2, a line A connecting the front and rear bolts 17 and 19 fastening the lower arm support bracket 15 to the knuckle body 14 normally toes-in when no load F toward the rear of the vehicle body is applied to the wheel W. That is, the line A is inclined inward in the vehicle width direction to the front of the vehicle body. Thus, when the wheel W passes over an uneven spot on the road surface or a brake is applied to the wheel W to cause the load F toward the rear of the vehicle body to act on the knuckle 13, a kingpin trail of the suspension device S is placed inward in the vehicle width direction from the ground contact point of the wheel W, so that the load causes the wheel W and the knuckle 13 to oscillate in a toe-out direction, to thereby reduce a toe-in angle of the line A connecting the front and rear bolts 17 and 19 toward zero (see line A').

Thus, even if the wheel W passes over the uneven spot on the road surface or the brake is applied to the wheel W to cause the load F toward the rear to act on the knuckle 13, the line A connecting the front and rear bolts 17 and 19 toes-in and the front and rear bolts 17 and 19 are substantially aligned with a front-rear direction of the vehicle body, to suppress twisting moment applied to the front and rear fastening portions 14c and 14d by the load F, thereby reducing the loads applied to the bolts 17 and 19 to increase durability, and allowing use of the bolts 17 and 19 having small diameters to reduce their weights.

Figure 6:
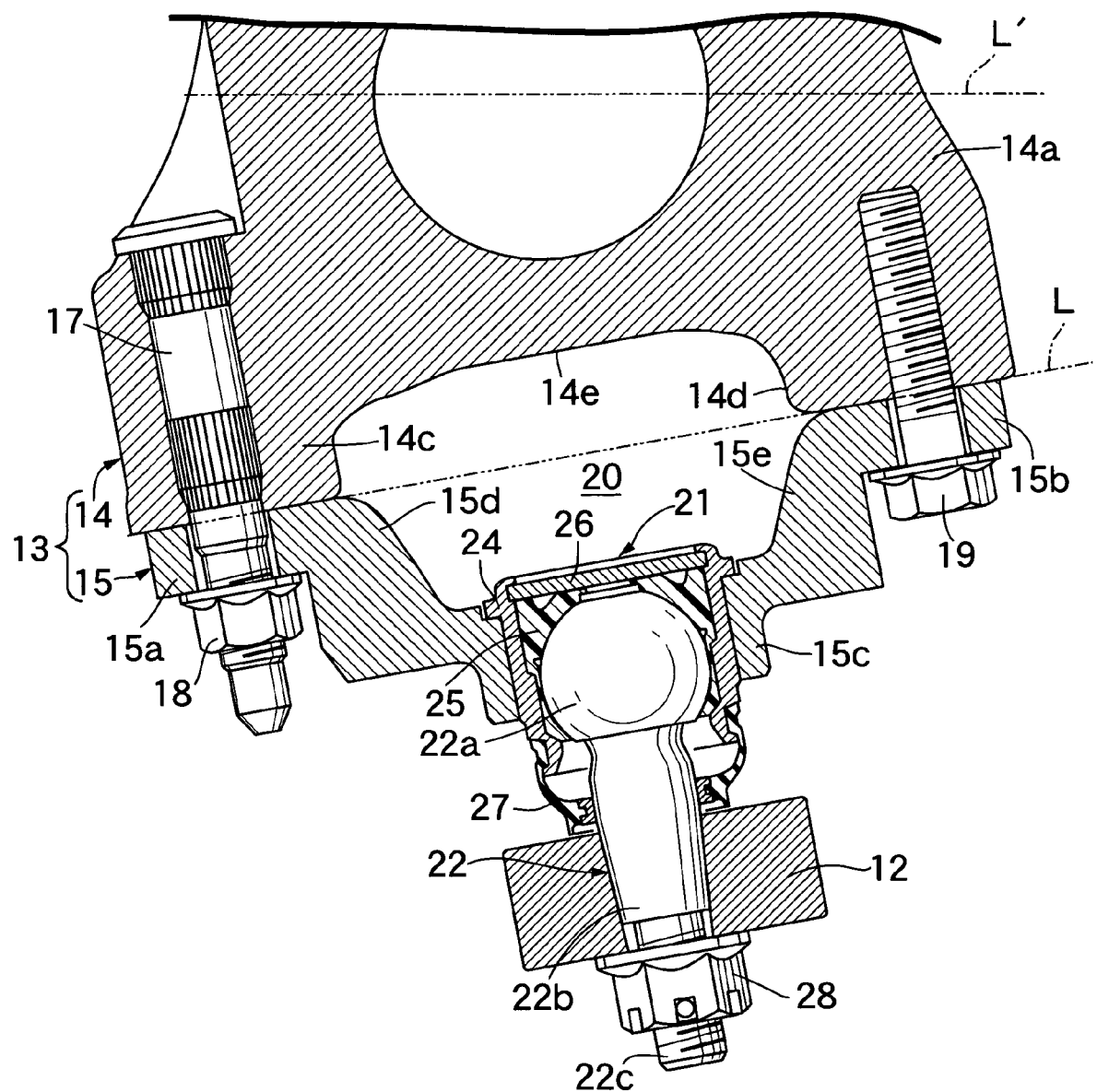
FIG. 6 is a view corresponding to FIG. 4 according to a second embodiment of the invention.

Next, a second embodiment of the invention will be described with reference to FIG. 6.

In the first embodiment, the ball stud 22 of the ball joint 21 is secured to the lower arm support bracket 15, while in the second embodiment, a housing 24 of a ball joint 21 is secured to a lower arm support bracket 15. Specifically, the housing 24 of the ball joint 21 is pressed from above to down into a mounting hole 15f formed in a lower arm support portion 15c of the lower arm support bracket 15. An outer end of a lower arm 12 in a vehicle width direction fits to a ball stud 22 protruding downward from the housing 24, and is fastened with a nut 28.

Also in the second embodiment, in a normal situation under acceleration of 1 G on a vehicle, a line L connecting fastening surfaces of front and rear fastening portions 14c and 14d of a knuckle body 14 is inclined downward to the front. Suspension geometry is set so that when a wheel W bumps upward, the line L moves up to be horizontal (see line L').

A line A connecting front and rear bolts 17 and 19 fastening the lower arm support bracket 15 to the knuckle body 14 normally toes-in when no load F toward a rear of a vehicle body is applied to the wheel W. When the load F toward the rear of the vehicle body is applied to the wheel W, a toe-in angle of the line A connecting the front and rear bolts 17 and 19 decreases toward zero.

Therefore, the same operational effects as the first embodiment may be achieved by the second embodiment.

The embodiments of the invention have been described above, but the invention is not limited to the above described embodiments, and various changes in design may be made without departing from the subject matter of the invention described in the claims.

In the embodiments, the double wishbone type suspension device S has been described as an example, but the invention is applicable to any other type of suspension device.

In the embodiments, the front bolt 17 is a stud bolt and the rear bolt 19 is a normal bolt, but any types of bolts may be selected as desired.

In the embodiments, the front and rear bolts 17 and 19 have the same thickness, which is not always necessary.

What is claimed is:

1. A suspension device comprising:
   a knuckle formed by a knuckle body and
   a lower arm support bracket fastened to and directly engaging front and rear fastening portions provided in a lower portion of the knuckle body with front and rear bolts, wherein a surface area of an uppermost portion of the lower arm support bracket engaging the front and rear fastening portions of the knuckle body is less than a surface area of a lower most portion of the front and rear fastening portions of the knuckle body engaging the lower arm support bracket; and
   a lower arm having an inner end portion in a vehicle width direction connected to a vehicle body, and
   an outer end portion in the vehicle width direction connected to the lower arm support bracket;
   an angle of a line connecting fastening surfaces of the front and rear fastening portions changing according to a bump and a rebound of the knuckle, wherein the angle of the line moves closer to the horizontal as the knuckle bumps from a normal position.

2. A suspension device comprising:
   a knuckle formed by a knuckle body and
   a lower arm support bracket fastened to and directly engaging front and rear fastening portions provided in a lower portion of the knuckle body with front and rear bolts, wherein a surface area of an uppermost portion of the lower arm support bracket engaging the front and rear fastening portions of the knuckle body is less than a surface area of a lowermost portion of the front and rear fastening portions of the knuckle body engaging the lower arm support bracket; and
   a lower arm having an inner end portion in a vehicle width direction connected to a vehicle body, and
   an outer end portion in the vehicle width direction connected to the lower arm support bracket,
   wherein a line connecting the front and rear bolts normally toes-in, and
   a toe-in angle decreases when a load toward a rear of the vehicle body is applied to the knuckle.

3. The suspension device according to claim 1, further comprising a ball joint connected to the lower arm and the lower arm support bracket, wherein a center of the ball joint is disposed below the line connecting said fastening surfaces.

4. The suspension device according to claim 3, wherein the ball joint is orthogonally fastened to the lower arm support bracket and, wherein a bottom of the lower arm support bracket is set substantially planar.

5. The suspension device according to claim 1, wherein the front and rear bolts are set to be perpendicular relative to the line connecting said fastening surface.

6. The suspension device according to claim 1, wherein said angle of the line connecting said fastening surfaces is inclined downward relative to a front of the suspension device.

7. The suspension device according to claim 3, wherein said angle of the line connecting said fastening surfaces is different from an angle of a bottom line of the lower arm support bracket, which is fastened with the ball joint.

8. The suspension device according to claim 3, wherein the ball joint has a head portion integrally formed with a ball stud, the head portion being connected to the lower arm support bracket, the ball stud being connected to the lower arm, wherein the lower arm is disposed below the lower arm support bracket and is separated therefrom.

9. The suspension device according to claim 2, wherein the knuckle has an axle support portion, which rotatably supports a wheel, wherein a surface of the axle support portion is different from the line connecting the front and rear bolts when taken in a plan view.

10. The suspension device according to claim 9, wherein the line connecting the front and rear bolts is inclined more in a toe-in direction than said surface of the axle support portion.

11. The suspension device according to claim 9, wherein a degree of inclination of the line connecting the front and rear bolts decreases toward zero when a load is applied to the knuckle in a direction toward a rear of the vehicle body.

* * * * *